(No Model.)  4 Sheets—Sheet 1.

J. PATTEN.
ROTARY ENGINE.

No. 263,573.  Patented Aug. 29, 1882.

Witnesses:

Inventor:
John Patten
By his Attys (No Model.)  4 Sheets—Sheet 2.

J. PATTEN.
ROTARY ENGINE.

No. 263,573.  Patented Aug. 29, 1882.

Witnesses:
Wm. F. Clark
Wm. Voit

Inventor:
John Patten
By his Attys.,
Bone & Oehmr (No Model.) 4 Sheets—Sheet 3.
J. PATTEN.
ROTARY ENGINE.
No. 263,573. Patented Aug. 29, 1882.
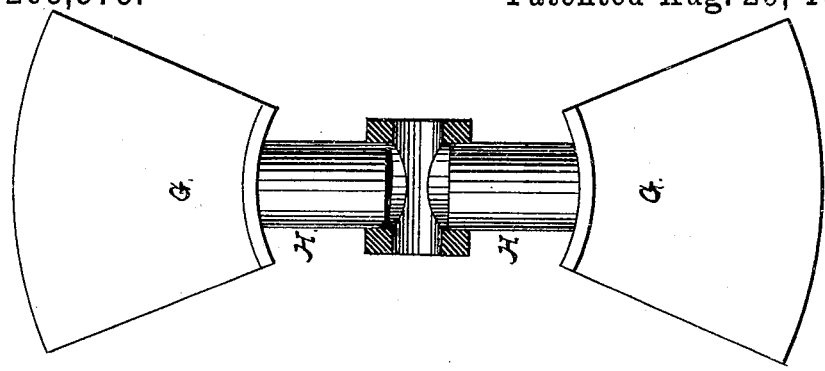
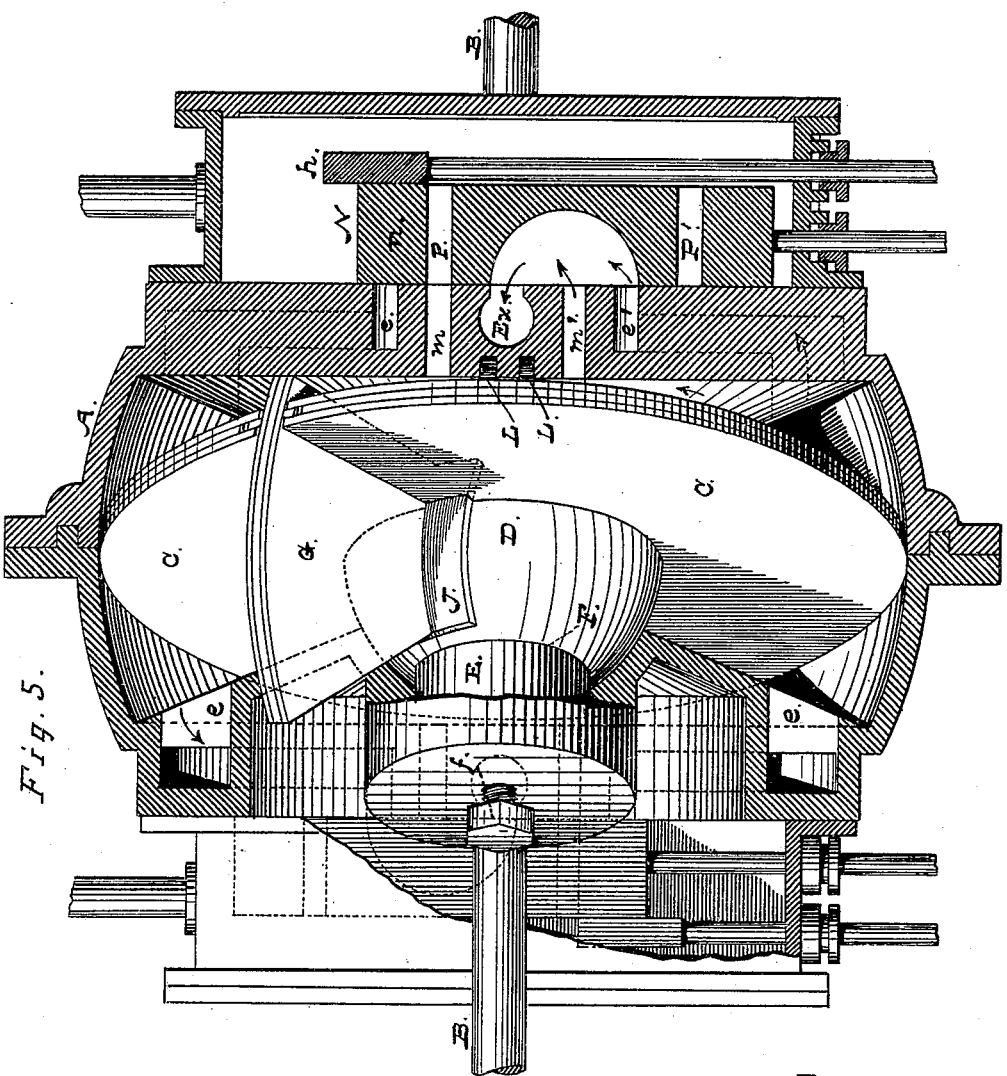
Witnesses:
Inventor:

(No Model.)  4 Sheets—Sheet 4.

J. PATTEN.
ROTARY ENGINE.

No. 263,573. Patented Aug. 29, 1882.

Witnesses:
Wm. P. Clark
Wm. Voit

Inventor:
John Patten.
by his Atty. Boone Osborn

UNITED STATES PATENT OFFICE.

JOHN PATTEN, OF SAN FRANCISCO, CALIFORNIA.

ROTARY ENGINE.

SPECIFICATION forming part of Letters Patent No. 263,573, dated August 29, 1882.

Application filed August 20, 1881. (No model.)

*To all whom it may concern:*

Be it known that I, JOHN PATTEN, of the city and county of San Francisco, in the State of California, have invented an Improved Rotary Engine; and I do hereby declare that the following is a full, clear, and exact description thereof, reference being had to the accompanying drawings.

My invention relates to a rotary engine in which the chamber of the cylinder is divided diagonally by a rotating disk and transversely by one or more pistons, which bisect the disk and move through it from side to side as the two revolve together, so that the disk divides the chamber into two separate compartments, into and from each of which steam or other working fluid is supplied and exhausted independent of the other, while it acts against the same piston or pistons in both of the compartments, all as hereinafter more fully described.

Figure 1:
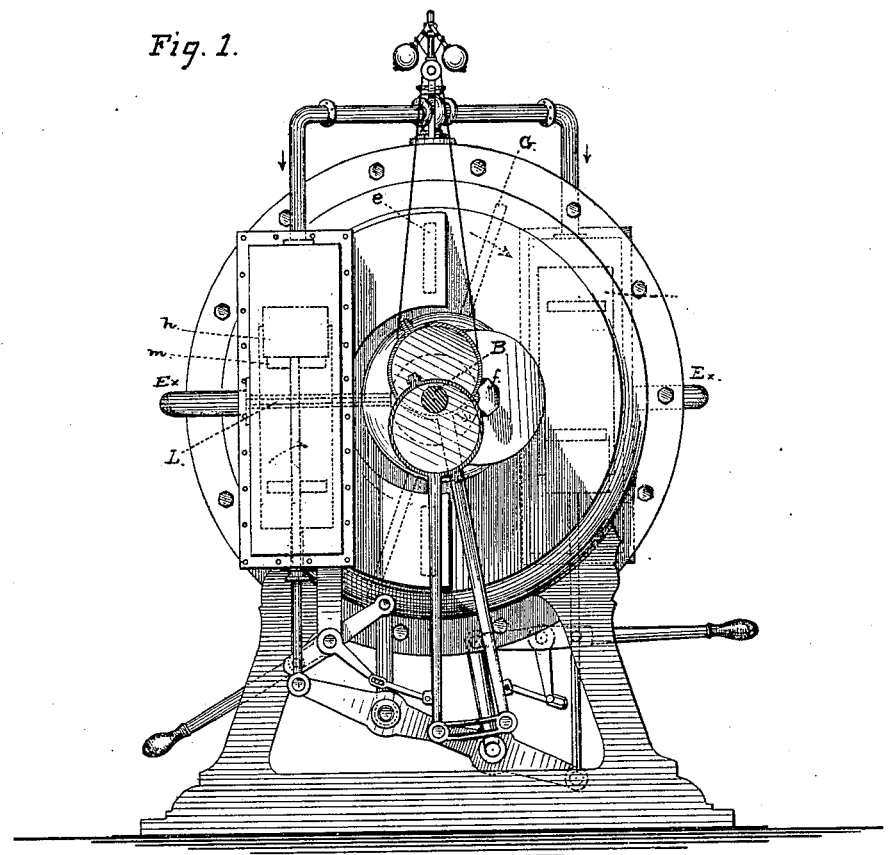
Figure 2:
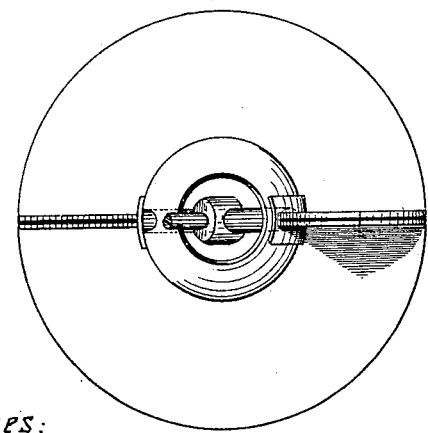
Figure 3:
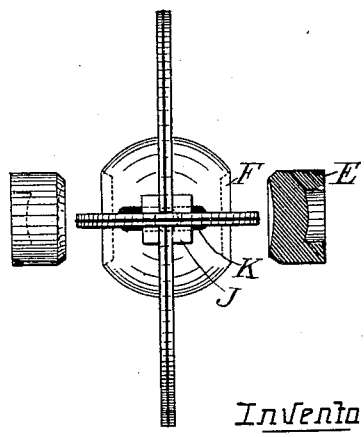
Figure 4:
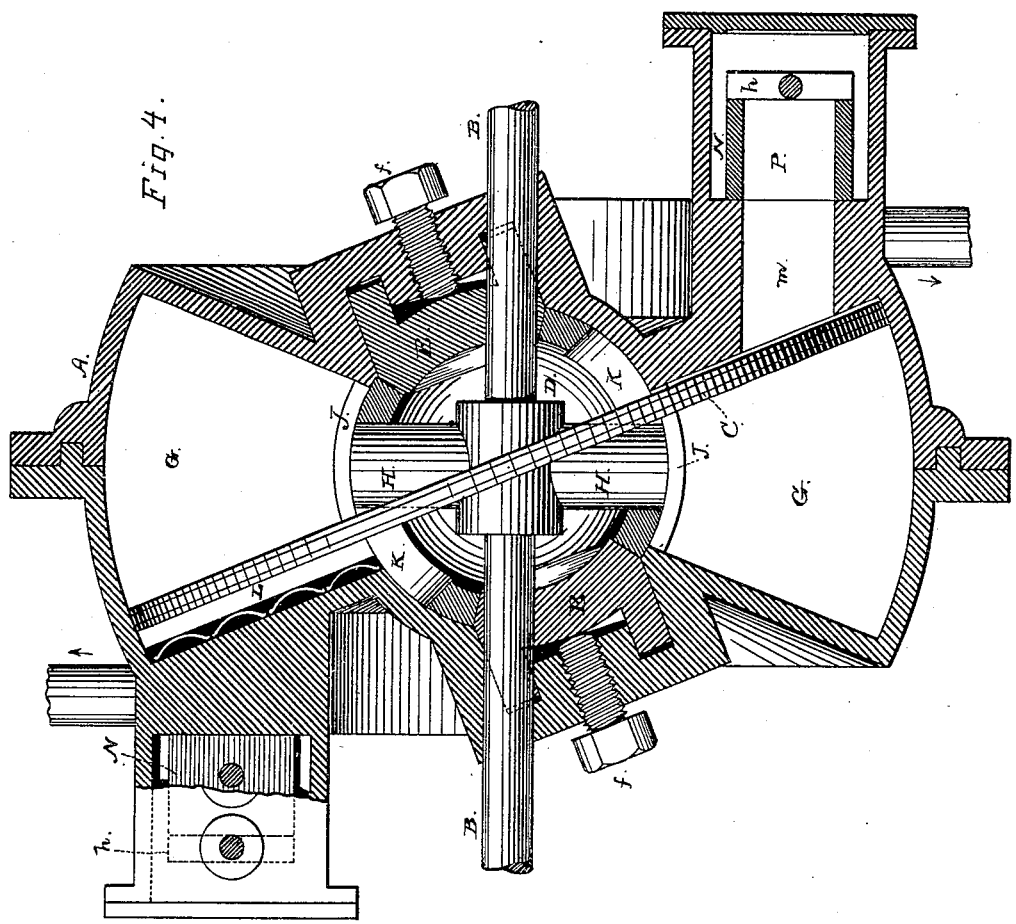
Figure 7:
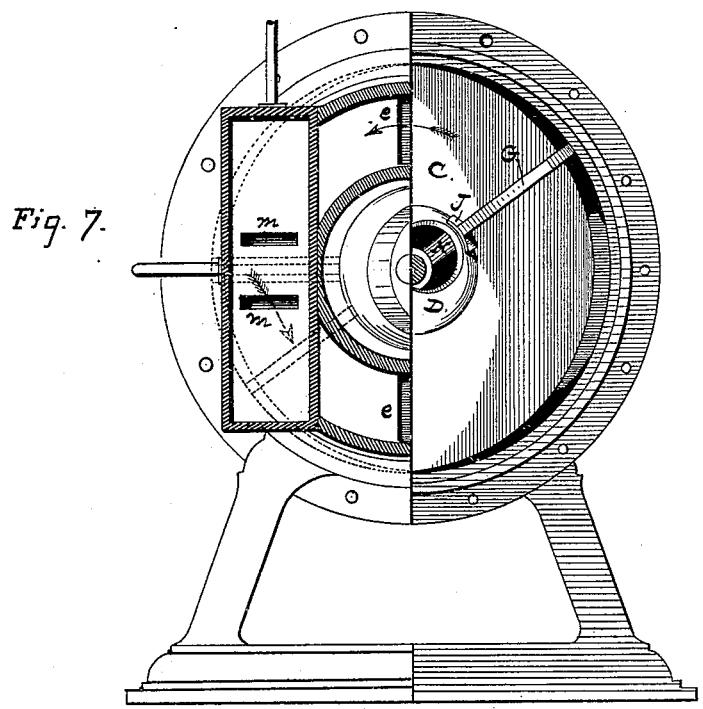
Figure 8:
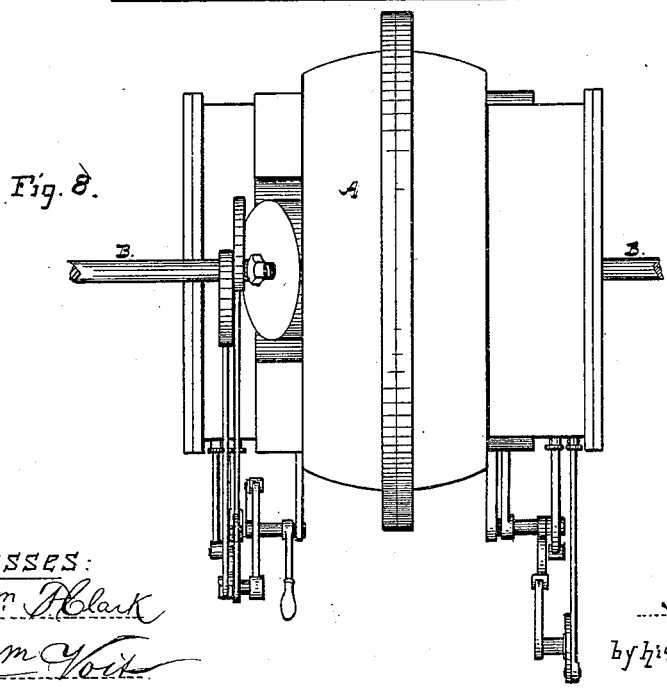

Referring to the accompanying drawings, Figure 1 is an elevation of a rotary engine constructed in accordance with my invention and provided with valve-gear for working steam expansibly. Fig. 2 is a view of the diagonal disk C, showing it in side elevation and removed from the cylinder. Fig. 3 is an edge view of this disk shown in the last-named figure, with the bearing-blocks for the spherical hub of the disk. Fig. 4 is a horizontal section through the cylinder and the steam-chest. The engine-shaft and the diagonal disk are not in section. Fig. 5 is a sectional view, enlarged, taken transversely through the cylinder and through the center of the steam chest and valves that are shown on the left-hand side of Fig. 1. Fig. 6 is a detail view of the piston. Fig. 7 is an elevation of the cylinder, with one half of the side removed to expose the disk and piston within the cylinder, and with the steam-chest and supplemental exhaust-passages in section upon the other half of the cylinder. Fig. 8 is a front view take from the right-hand side of Fig. 1.

Let A represent the case or shell of the engine-cylinder. The interior rim of this shell is concave, while the sides are convex, thus inclosing a chamber, the form of which is best illustrated by the solid which remains after boring a conical portion out of the opposite sides of a solid sphere.

B is the engine-shaft, which passes through openings in the center of each side of the case, and with which the pistons and diagonal disk are connected.

C is a disk, which is placed diagonally across the interior of the chamber, so as to divide it into two equal compartments, one on each side of the disk. The position of this disk, it will be noticed, is such that it presses close against the flaring wall of one compartment on one side of the center and close against the wall of the other compartment on the opposite side, while its rim or periphery fits close against the interior rim of the chamber, thus dividing the main chamber into two crescent-shaped compartments which face in opposite directions. The disk will then form one side of both the compartments. A circular opening is made in the center of the disk, in which a portion of a hollow sphere, D, is secured, so that the disk forms an equatorial flange surrounding the sphere, and the two move together as one. A hole or opening, F, is made in the sphere on each side of the disk in a line at right angles to the plane of the disk, and the disk and its sphere are supported in position by a tubular block, E, on each side, the edge of which fits against the edge of the opening in the sphere. These blocks are adjustable by means of screws *f f*, so that they can be set toward or from the sphere. These blocks are stationary, while the sphere rotates between them, the bearing for the edges of the sphere being against the edges of the blocks. The axis of the disk will then be diagonal to the line of the engine-shaft B. The exterior face of the sphere on each side of the disk will fit against the circular opening in the center of the case or shell A, and the intermediate portion will form the bottom of the chambers. The engine-shaft passes through both the tubular blocks E and sphere; but as above stated it passes axially through the cylinder. The disk and its sphere will then rotate together in a plane diagonal to a vertical plane drawn at right angles across the engine-shaft. The edges of the radial slots in the disk are rounded, and a packing is introduced between them and the piston on each side, so that the angle of piston with relation to the disk can change as it traverses across the disk and at the same time keep a tight joint.

The pistons G G are connected together by a bar, plate, or rod, H, which is secured to the engine shaft B at its middle in any convenient way. This bar, plate, or rod passes vertically across the opening in the center of the engine, and its ends pass through the sphere D, while the pistons G are attached to its extremities and stand transversely across the cylinder. Each piston fits in a radial slot in the disk C, in which it can move easily and freely, so that when the pistons are driven they will move laterally through the slot from side to side as the disk travels across the plane of the pistons, thus projecting the pistons gradually from one side of the disk to the other. The openings in the sphere D, through which the ends of the bar, plate, or rod H pass, are slotted on opposite sides of the shaft at K, in a plane with the pistons, so that the piston and disk can move laterally with relation to each other; and the bar, plate, or rod H carries a covering-plate, J, which moves against the interior face of the sphere and covers the opening.

L L are the packings, which are placed in grooves in the wall of the cylinder opposite the points of closest contact between the faces of the disk and the angular face or wall of the chamber, and these packings are pressed outward against the faces of the disk by springs. (Shown in Figs. 4 and 5.) The adjustment of the pistons is such that when they are opposite the abutments their entire width projects on the opposite side of the disk, so that they pass the packings readily.

The steam-ports $m$ $m'$, through which steam is admitted to drive the engine, connects with the interior of the cylinder just in front of the packings, while the exhaust-ports $e$ $e'$ connect with it just behind the packings. The arrangement of the ports will vary according to the character of the motive agent. For instance, in a water-wheel, pump, or blower the port for admitting the fluid into the cylinder is enlarged, so that it extends from the packing one-fourth the distance around the cylinder, and the exhaust-port is also enlarged to the same proportion. Consequently while making one-half of the revolution the pressure against the piston on one side is equal to the pressure on the other side, so that each piston is only working one-half of the time. This by no means impairs the operation of the machine, for while the piston is passing the port on one side of the disk it is working on the opposite side.

The operation will therefore be as follows, referring to Fig. 5 for the preliminary position of the parts: As represented in this figure, the two pistons have just passed the packings and are taking steam behind them, while the steam in front of them is working expansively against the next piston, which has a larger area exposed to pressure, and the steam in front of the next piston is exhausting behind the packing. Owing to the conical form of the sides of the cylinder and the diagonal position of the disk, the chamber on each side is in the form of a crescent. The disk forms one side of each chamber, and it is carried around in its diagonal plane by the pistons as they move in a vertical plane. The diagonal inclination or angle of the disk is just equal to the width of the pistons, so that every time the disk and pistons make a complete revolution each piston moves laterally through the slot in the disk and back again. Now, when steam is admitted behind the pistons, as represented at Fig. 5, the pistons have just commenced to move through the slot in the disk and the full pressure of the steam is exerted against that portion which projects through the disk on the steam side. As the pistons move farther away from the steam-ports they gradually present larger surfaces until they pass the opposite side of the engine, after which the space in front of them gradually contracts in size toward the exhaust-ports until the pistons again pass the abutments. When working the engine solely by the pressure of the steam the steam acts against each piston on one side of the disk from the time it passes the packings until it passes half-way round the cylinder, at which point the steam is cut off by the next piston passing between it and the abutment, after which the steam exhausts during the balance of its stroke; but during this latter part of the stroke the piston gradually moves through the disk and takes steam in the opposite chamber, so that each piston is being driven by live steam on one side of the disk while it is either exhausting or working expansively on the opposite side. In working the steam expansively it is cut off when the piston has moved through a portion of its stroke only—that is, before it reaches the point where the following piston commences to take steam behind it. The steam then works expansively until the piston has moved three-fourths of the distance around the cylinder, when it commences to exhaust through the preliminary exhaust-port, which is connected with the main exhaust by a port or passage, $e$. This same arrangement will form an excellent water-wheel or air-compressor. For the latter purpose it is especially useful, as its arrangement is such that it will compress air in proportion to the power employed to drive it.

For compressing air the port through which the air is admitted into the cylinder is arranged in the same way; but the exit-port through which the air is forced must be just in front of the packing. When the air is to be compressed to a very high tension I will place a check-valve over the egress-port to prevent the air re-entering into the machine again.

For a steam-engine the exhaust-port can be the same as the ingress-port to the compressor, water-wheel, pump, and blower; but the ingress-port through which the steam will be admitted into the engine to drive the machine will be constructed like the egress-port to the air-compressor. When the ports are so arranged it is obvious that by having two pistons directly opposite each other as soon as one makes one-half of a revolution the other passes the port and cuts off the steam. Consequently the steam is worked under full pressure one-half of the way around. Then it works expansively one-quarter farther. It is then exhausted, and the action of the piston is dormant during the remaining portion of the stroke. With this arrangement two volumes of steam are expanded to three volumes, and then exhausted.

As it is sometimes desirable to produce a more economical engine by expanding the steam more than this, and as it is also very essential for a handy engine to be reversible to accomplish these objects, I arrange my valve-ports substantially as shown in the accompanying drawings, in which $m$ $m'$ are ports on each side of the packings, which can be used either for ingress or egress, according to which way the engine is to revolve.

$e$ $e'$ are ports which connect with the interior of the cylinder and extend one-fourth of the way round from the packings.

The large D-valve N is so arranged as to cover the ports $m'$ $e'$, so as to make them both exhaust-ports at the same time, and while it is in this position the other end, $n$, covers the port $e$ and makes it lie dormant. Two ports, P P′, extend through the valve N, which correspond with the ports $m$ $m'$ in the cylinder-case. At present the port P is directly over the port $m$, thereby allowing the steam to pass from the steam-chest to the cylinder, and the port P′ is dormant.

For an ordinary engine, where the steam is expanded from two to three volumes, the valve N is the only one used, and it remains stationary while the machine is revolving in one direction; but must be moved so as to make the port P′ correspond with the port $m'$ for reversing the engine.

When it is desired to expand the steam farther than it can be expanded in the above manner I use an additional valve, $h$, which is handled in the usual manner by an eccentric.

For a reversible engine I use the ordinary link-motion, which I have represented in my drawings for the purpose of showing how it is applied, but on which I make no claims.

Having thus described my invention, what I claim, and desire to secure by Letters Patent, is—

1. The adjustable cylindrical blocks E, in combination with the sphere D, truncated at both ends.

2. The pistons G G, connected with the engine-shaft B by the rods, plates, or bars H, passing through slots in the sphere D, and the covering-plate J, connected to and operated by said bars H, as set forth.

3. The combination, with the slotted disk having the spherical hub D, in which are the recesses F and slots K, of the journal-block E and the pistons G, fixed to the engine-shaft, as set forth.

4. The combination of the pistons G, fixed to the shaft B, with the slotted disk, having the spherical hub with its central recesses or openings, F, and elongated slots K, and the adjustable journal-blocks E, as set forth.

5. The combination of the case or cylinder A, having ingress and egress ports $m$ $l$ $m'$ $l'$ and the diagonal stays for the journal-blocks E, the abutments L L, grooved into the cylinder-case, the shaft B, having pistons G secured to it, the slotted disk C, with spherical hub in which are the apertures F K, and the journal-blocks E, as set forth.

JOHN PATTEN.

Witnesses:
C. D. COLE,
J. H. BLOOD.